United States Patent
Rahmes et al.

(10) Patent No.: US 7,391,899 B2
(45) Date of Patent: Jun. 24, 2008

(54) SYSTEM AND METHOD FOR THREE DIMENSIONAL CHANGE DETECTION AND MEASUREMENT OF A SCENE USING CHANGE ANALYSIS

(75) Inventors: Mark Rahmes, Melbourne, FL (US); Robert M. Garceau, Rockledge, FL (US); Anthony O'Neil Smith, Melbourne, FL (US); John Karp, Indialantic, FL (US); Todd Ham, Alexandria, VA (US); David Elsner, Melbourne, FL (US); Harlan Yates, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 396 days.

(21) Appl. No.: 11/095,057

(22) Filed: Mar. 31, 2005

(65) Prior Publication Data

US 2006/0228019 A1 Oct. 12, 2006

(51) Int. Cl.
 *G06K 9/00* (2006.01)
 *G06K 9/62* (2006.01)
(52) U.S. Cl. .................. 382/154; 382/209; 382/217
(58) Field of Classification Search .............. 382/154, 382/209, 217–221
 See application file for complete search history.

(56) References Cited

U.S. PATENT DOCUMENTS

| | | | | |
|---|---|---|---|---|
| 5,642,299 A * | 6/1997 | Hardin et al. | ............... | 702/142 |
| 5,819,016 A | 10/1998 | Watanabe et al. | ........... | 395/119 |
| 6,064,760 A | 5/2000 | Brown | ........................ | 382/154 |
| 6,243,483 B1 | 6/2001 | Petrou et al. | ................ | 382/103 |
| 6,675,121 B1 * | 1/2004 | Hardin et al. | ............... | 702/142 |
| 6,792,140 B2 | 9/2004 | Matusik et al. | ............. | 382/154 |
| 6,819,016 B2 * | 11/2004 | Houle et al. | .................. | 310/52 |

OTHER PUBLICATIONS

F. Samadzadegan, A. Azizi, Michael Hahn, "Automatic Change Detection of Urban Geospatial Databases Based on High Resolution Satellite Images Using AI Concepts".

* cited by examiner

*Primary Examiner*—Brian Q Le
(74) *Attorney, Agent, or Firm*—Allen, Dyer, Doppelt, Milbrath & Gilchrist, P.A.

(57) ABSTRACT

A method (100) comprises steps of: receiving a first digital model (102) of a first three-dimensional scene comprising at least one object; receiving a second digital model (112) of a second three-dimensional scene comprising at least one object; and performing a change analysis (102) on the first and second digital models to provide a difference indication representing a difference between the first and second models. In one embodiment a mean square error operation (110) is performed on the first and second digital models to provide a value indicating the difference between the digital models. In another embodiment, a conflation operation is performed on the difference model provided by the change analysis (120) and an object level change database (124) is produced.

24 Claims, 5 Drawing Sheets

SYSTEM AND METHOD FOR THREE DIMENSIONAL CHANGE DETECTION AND MEASUREMENT OF A SCENE USING CHANGE ANALYSIS

FIELD OF THE INVENTION

The invention disclosed broadly relates to the field of image data processing systems and more particularly relates to the field of detection of changes in three-dimensional images and high-resolution terrain models.

BACKGROUND OF THE INVENTION

Digital representations of three dimensional (3D) scenes (or sites such as cities) are well known. Such representations are typically generated using data collected by instruments such as LIDAR (Light Detection And Ranging), IFSAR (Interferometric Synthetic Aperture Radar), photogrammetric techniques, or surveys. The collected data represents the topology of the scene. These instruments and systems produce digital terrain elevation data suitable for use in providing terrain visualization systems. However, there is a need for determining changes in these sites or scenes as they change over time (or by use of different data collection systems). That need is driven by applications such as immediate identification of new construction, rapid 3D assessment of damage done by natural forces such as hurricanes or tsunamis, by bombardment in a battle environment, and digital nautical charts.

For the scope of this document, we define a Digital Terrain Model (DTM) as a digital dataset comprised of elevations. Each elevation possesses—or has the ability to derive due to its storage format—a horizontal coordinate reference system component (such as WGS84 latitude & longitude) and a height (such as bare earth relative to WGS84 Mean Sea Level). Various implementations of DTMs constrain the horizontal spacing to be uniform (such as in a "gridded DTM" like DTED®) while others record the data in a series of triangular faces, such as in a triangulated irregular network (TIN). Still other implementations support storage of multiple heights for a single horizontal location. By convention, a DTM with uniform horizontal spacing (e.g. a "gridded DTM") is called a Digital Elevation Model or DEM).

Additionally, for the scope of this document, we define a "3D Site Model" (or "3D Model" for short), as a polygonal representation of a scene. This polygonal representation supports the storage of objects (such as an individual building) by recording a series of elevations in a well-defined 3D geometry format such as might be used by a computer-aided design (CAD) system. In addition to offering a more complex depiction of a scene, a 3D Model offers advantages versus a DTM in that the 3D Model may additionally associate metadata with a given object (such as the owner of a building, the telephone number of the main switchboard, latest tax assessment, etc.). The downside to 3D Models is that they are typically much more labor-intensive to produce than is a DTM for the same scene.

SUMMARY OF THE INVENTION

The above need is addressed by an image processing system configured to determine a difference (or differences) between (or among) two or more digital models of 3D scenes. The digital models can be various types such as DTMs, 3D Site Models, or their equivalents. The digital models are possibly representations of the same scene using data collected at different times or using different sources. In one embodiment, a measure of the differences is obtained by performing a mean square error (MSE) operation on first and second sets of points, respectively derived from first and second digital models analyzed to provide a value representing the difference (or changes) between these models.

In another embodiment, a change analysis is performed to determine a difference between first and second DEMs to provide a difference DEM that indicates at least some of the differences between the DEMs. The change analysis can be done by subtracting one digital model from the other to provide a difference digital model (e.g., difference DEM). The subtraction can be done on a point by point basis such that for each geospatially corresponding set of points in the digital model if the difference exceeds a threshold the output is the difference and if it is not exceeded, the output is null.

In yet another embodiment, a conflation operation or function is performed on the difference DEM to provide object level changes with attributes. In another embodiment the differences in two scenes are represented by providing an indication of the differences at the level of the objects comprised by the scene. This object level difference information is used to create a database of object level differences.

DETAILED DESCRIPTION

Figure 1A:
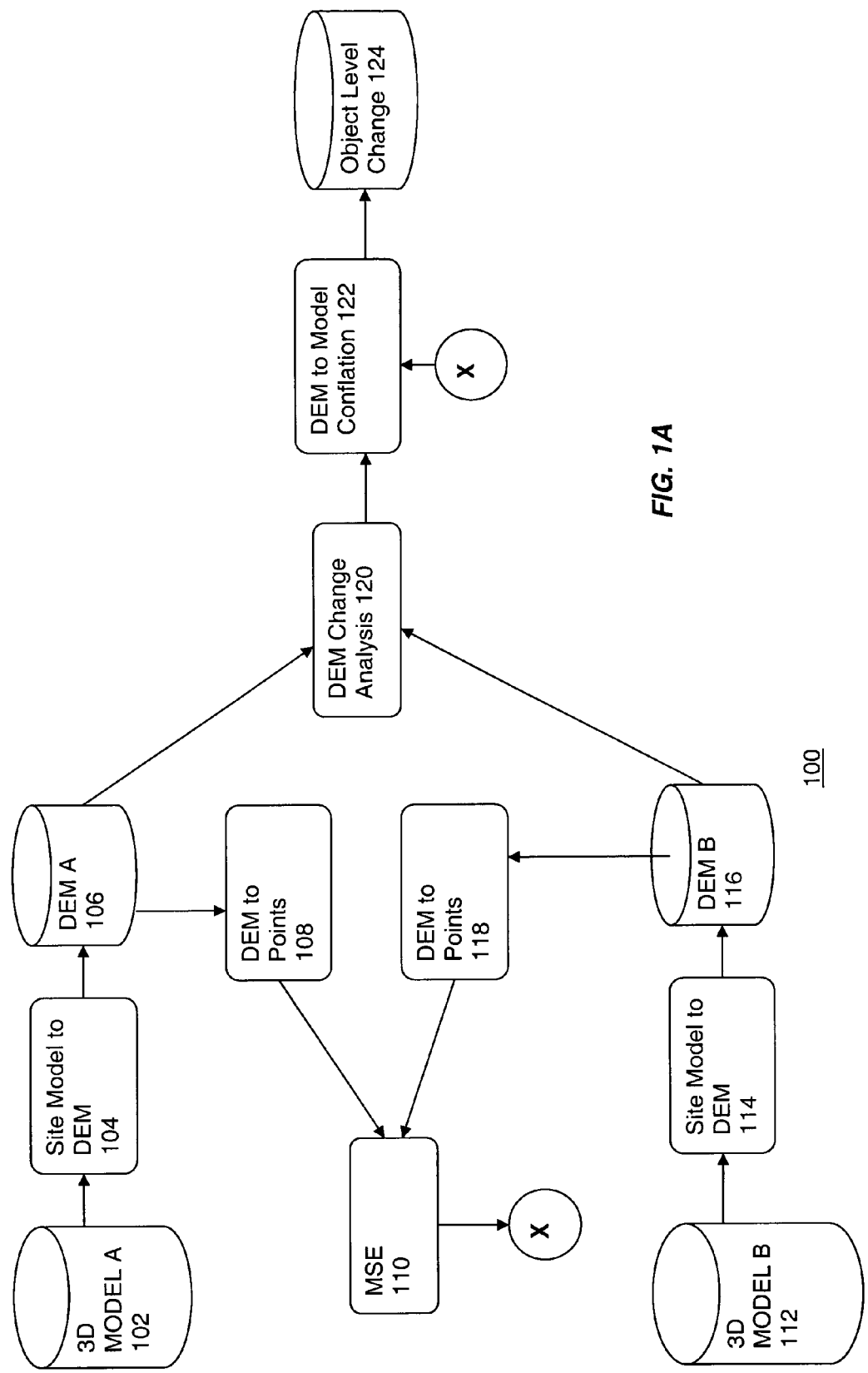
FIG. 1A is a flowchart of a process for determining a difference between first and second digital models such as DEMs.
Figure 1B:
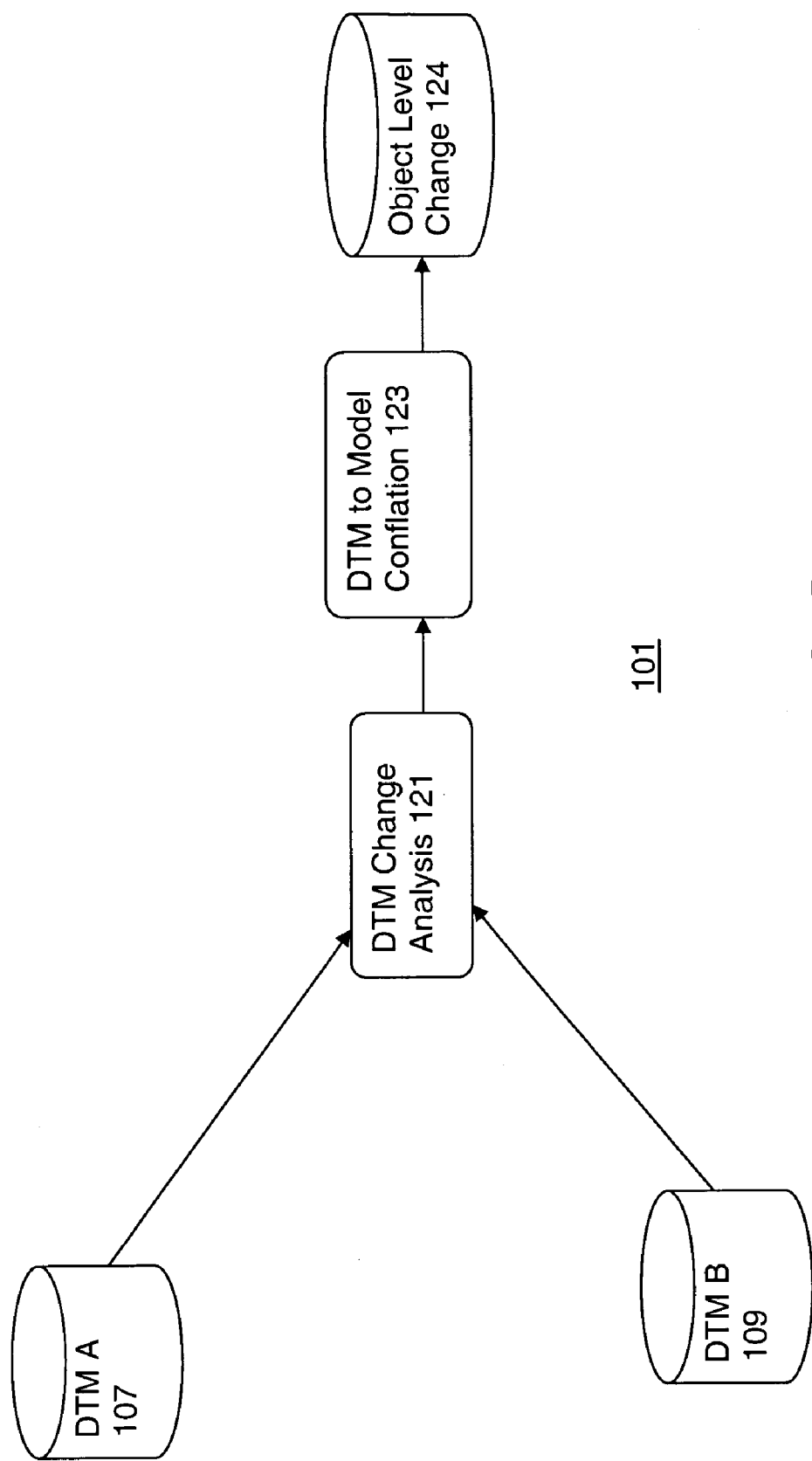
FIG. 1B is a flowchart of a process for determining a difference between first and second DTM models.

FIGS. 1A and 1B illustrate systems and methods 100 and 101, respectively, for detection of one or more differences in 3D scenes represented by digital models created with data collected form the scenes. We discuss an example where the scenes represent a city block comprising buildings and other structures that are represented as objects in their corresponding digital models. Referring first to FIG. 1A, the system 100 receives first 102 and second 112 (or 3D Model B) digital models of a three dimensional scene such as a city block (see FIG. 2). We use the term "city block" as a generic description, though the approach applies to any geospatial region of the Earth whether urban or rural or having a large or small extent. In this embodiment, the first digital model is a three-dimensional (3D) polygonal model 102 (or 3D Model A) and the second digital model is a 3D polygonal model 112, each representing a different scene (A or B). Each of the polygonal models 102 and 112 comprises a set of digital data representing a scene comprising one or more city blocks. In this example, the polygonal data takes the form of a set of triangles or other polygons expressed in one or more mathematical coordinate systems representing the buildings (objects) represented by the digital model. The polygonal model also comprises other metadata information or attributes about the objects included in the representation of the subject scene. One such item of information is the identification of the locations and bounds of objects such as buildings, but the information can also include items such as whether the building is a government building. The digital models can be any other digital representation of the scenes suitable for processing as discussed herein. The model information representing the city block can be obtained using LIDAR that has been post-processed to polygonal form, manual measurements via survey or remotely-sensed photogrammetry, or any other suitable means of measuring the coordinates of the points used to represent the objects depicted.

Figure 1C:
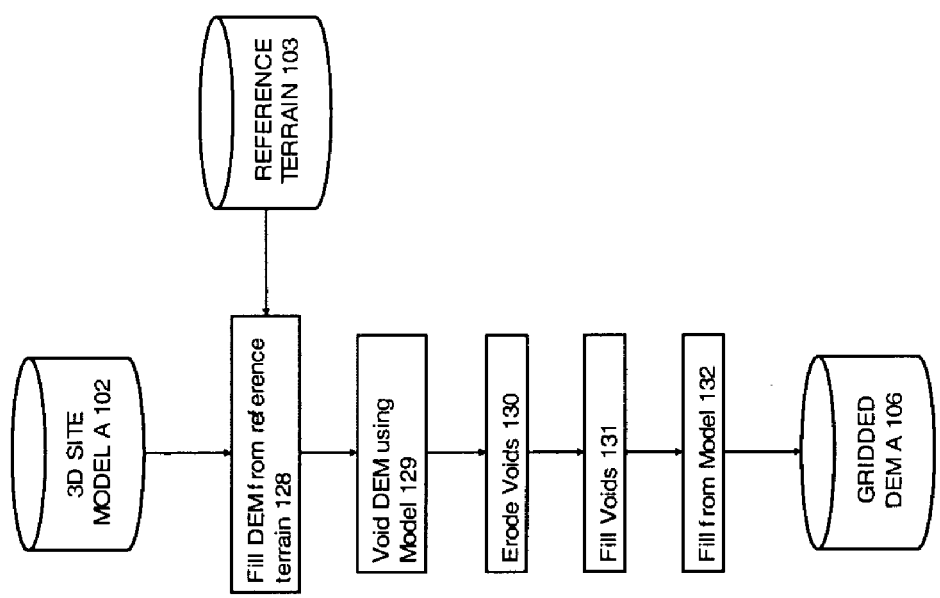
FIG. 1C is a flowchart of a process for generating a DEM from a polygonal model.

In steps 104 and 114 each polygonal model 102 and 112 is converted to a DEM (DEM A 106 and DEM B 116) of the same scene. The output of this conversion may be a DEM computer storage file or a computer programming language representation suitable for processing without having been written to a computer storage file. This conversion is done by sampling the polygonal models 102 and 112 at a fixed horizontal spacing interval, for example taking one-meter easting, northing spacing offset samples, to produce a grid surface comprising heights for the structures in the scene. By using a dense grid interval, the DEMs comprise the geometric information of the scene but do not include as much information about the scene depicted as the polygonal models. Though many such conversion techniques exist, for clarity an exemplary instance of steps 104 and 114 DEM generation method is as depicted in FIG. 1C. In step 128 a gridded (uniform in x, y dimensions) DEM is filled with elevation values from a reference terrain model. Reference terrain is typically a low resolution DEM and interpolation from the reference DEM is provided as necessary to populate the gridded DEM. In step 129, null (or void) values are inserted into the gridded DEM at each grid location where the polygonal model contains a non-null reference elevation. This is the initial step in creating a consistent ground intersection for our polygonal model. In step 130, the voids are eroded in the gridded DEM by N grid cells. N is a parameter and typically a small value, such as 1 or 2. This helps to ensure a smoother fit at the bases of our site model. In step 131, all voids are filled with values using a simple interpolation scheme to create continuity across the voids. In step 132, the entire DEM is traversed stepping to each grid location. The horizontal spatial coordinate for the gridded DEM index is computed and issue a query of the maximum elevation of the polygonal model at that location. If the elevation is non-null, it is inserted into the DEM at this grid location.

In steps 108 and 118, the system 100 converts DEMs A and B to lists of 3D points derived from the surface of the DEMs. In this example, the point list includes latitude, longitude, and height coordinates for each point.

In this embodiment, the second digital model is a 3D polygonal model 112 (3D Model B) representing the same scene as Model A represents but the data has been collected at a subsequent time B. Alternatively, Model B can be a model of scene A but wherein the data was collected using a different instrument or method. For example, the data included in Model A could be collected by a physical survey and the data included in Model B can be data collected by LIDAR.

Next in step 110, the system 100 performs a mean square error (MSE) function on the point sets produced in steps 108 and 118 to measure an indication of the relative error between these two sets of points. An MSE is a known operation for the determination of difference between two sets of data. As applied in this embodiment, the MSE provides a measure of difference between two digital models representing different scenes. The "error" determined is a measure of change (or delta) between the first and second models. The term "error" is used because we typically (but not necessarily) assume that one digital model represents the "truth" and the other contains "errors" that deviate from the "truth." In various embodiments we use the MSE operation on sets of points derived from various digital models such as polygonal models, DEMs or TINs.

We now show an example of how the MSE function is performed with 3D data. Let c=Lidar Data Voxels (ground truth) and let x=3D Model Voxels. The MSE can be obtained using the following equation:

$$MSE = \frac{1}{n}\sum_{i=1}^{n}\sum_{j=1}^{n}\sum_{k=1}^{n}(x_{ijk} - c_{ijk})^2$$

where (x−c) are points from resulting subtracted DEMs or other digital models. The parameters i, j, and k correspond to three dimensions (latitude, longitude, and height) of each point. When the data is contained in a gridded DEM, and there is only one height per latitude and longitude, the MSE equation is iterative over the latitude and longitude dimensions and the height values are simply subtracted and squared.

The resulting MSE value is an indication or measure of the difference(s) between the scenes being compared. The MSE can be performed on digital models representing an entire scene or on corresponding objects (e.g., buildings or other structures) comprised by the scene. For example, we consider three approaches to performing an MSE: (1) In a first approach we treat a set of LIDAR DEM points (e.g., one meter DEM points) as truth (e.g., survey points), we convert the 3D Models A and B to DEMs A and B, respectively, then convert the DEMs to one meter points, and then measure the MSE between the resulting two sets of points. The result of this computation provides an indication of difference between the digital models of entire scenes (and hence of the differences between the scenes (2) In the second approach, after identifying the changed objects in the scenes, using a DEM to model conflation we get information on each changed object (e.g., from a polygonal model or other database comprising information on the individual objects that is not found in the DEM) and compute the MSE on the point clusters bounded by these objects to determine an object level metric attribute for each object. The object level attributes can be used to indicate differences such as changes in building height and the appearance of new objects or disappearance of old objects. For purposes of these embodiments we do not need to determine absolute error (i.e., the difference between a digital model and the truth model), only the relative error (or delta) between two digital models is needed. However, absolute error can be removed by shifting the DEMs according to known control points or control DEMs so that the model represents the truth as closely as possible. Each of the above approaches provides different indications of difference or change that may be useful for different purposes.

Continuing the change detection process of FIG. 1A, after the DEMs A and B are generated, the system 100 performs a DEM change analysis 120 on DEMs A and B. In another embodiment, the change analysis for a given pair of points, A and B, is done as a subtraction of each pair of corresponding points in the DEMs. For example if |A−B| is greater than a threshold, the output is computed as A−B or alternatively, simply as A; and, if it is not greater than the threshold, the output is null. Performance of this step presupposes that the sampling rate used to produce DEM A is the same as that used to produce DEM B. That assures that the points in the DEMs are positional counterparts so that a meaningful subtraction of coordinates can be performed. The change analysis 120 produces a difference digital model (in this case, a difference DEM) that includes only information on the objects that have changed from Model A to Model B (see FIG. 2, image 208 for an example of an image of such a difference DEM).

In step 122, the system 100 receives a difference DEM as an input and performs a conflation operation on that difference digital model. Considering the embodiment where the change analysis 120 produces a difference DEM, the system 100 identifies the objects included in the difference DEM and creates an object level change database 124 by adding attributes to each changed object. As discussed above, a DEM includes geometric information about each object. The difference DEM includes DEM data on the objects that have changed from DEM A to DEM B. Using this data, step 122 retrieves additional data on each changed object by referring to a more detailed database such as polygonal Models A and B to derive the additional data. Another possible item of additional data is provided by performing an MSE operation on each object in the difference DEM and each corresponding object in either DEM A or DEM B. The resulting MSE value can be stored in database 124 in association with the object to which it corresponds.

Thus, for an object such as a building object that has increased in height, the system 100 consults 3D Model A for the original height and the corresponding object in 3D Model B for the later height, computes the difference and associates the difference attribute with the corresponding object in the difference DEM. These object level change attributes are added to an object level change database 124. The conflation step 122 can also be done by referring to any database from which the relevant object level attributes can be derived. The information in the object level change database 124 can be graphically displayed (see FIG. 2, image 212 for example) or presented in text form to a user.

Referring to FIG. 1B, we show a flowchart of a system 101 that is substantially the same as system 100 (of FIG. 1A), except that instead of receiving DEMs A and B, system 101 receives DTMs A and B (107 and 109) and performs a step 121 on the pair of DTM models A and B, of the two scenes to be compared, in a manner similar to that of step 120 of FIG. 1 to produce a difference DTM that represents only the changed objects.

Figure 2:
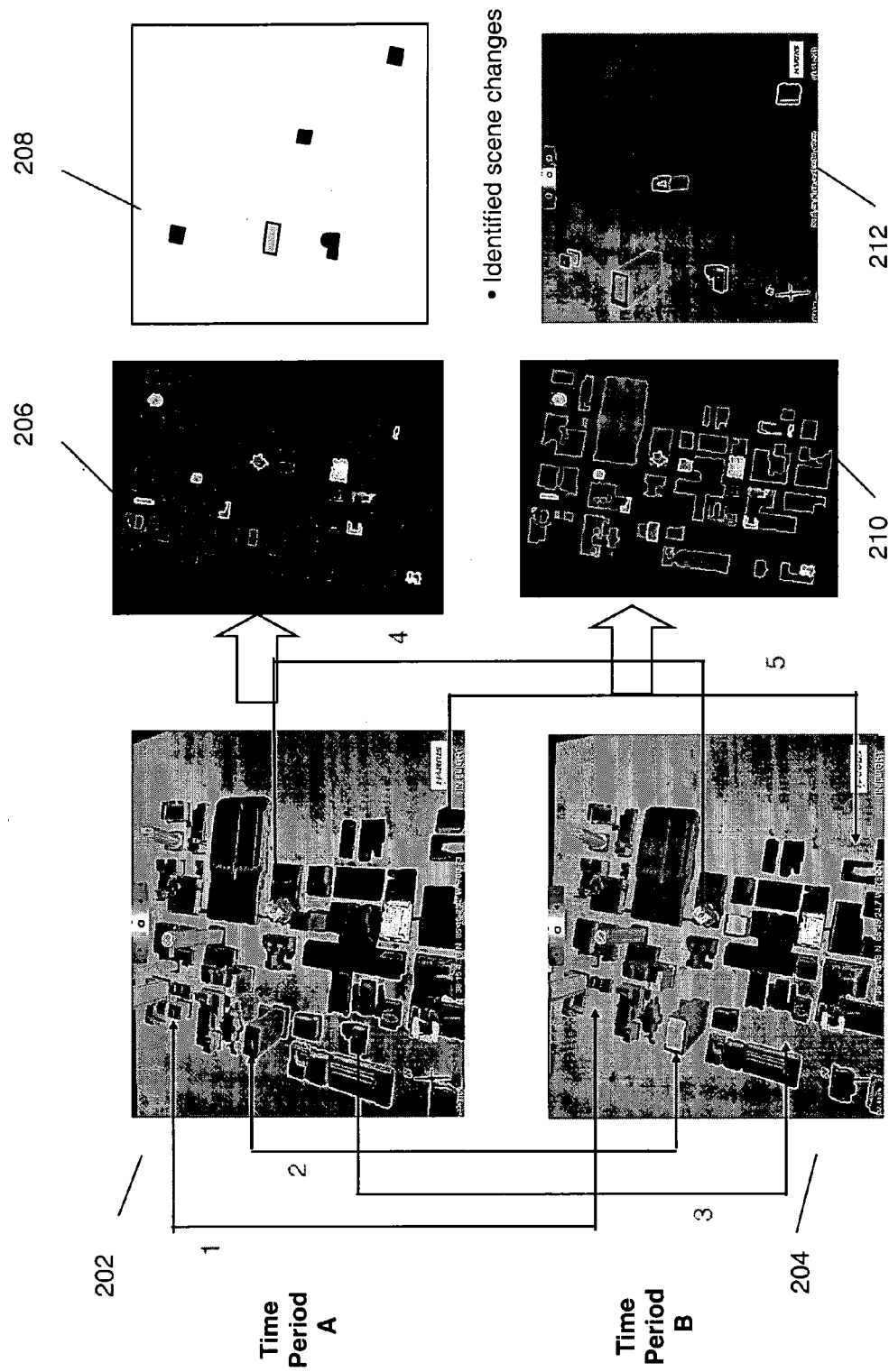
FIG. 2 illustrates visual elements of a change detection process according to embodiments of the invention.

FIG. 2 illustrates visual elements of a change detection process according to embodiments of the invention. Image 202 shows a scene of a site (Site A) at a time period A. This image includes three dimensional data on the building objects contained therein. In this embodiment the image 202 is generated with information from 3D (polygonal) Model A. Image 204 is the same kind of 3D image as image 202 and shows the same geographic site at a time period B, which is later than time period A (we call this second scene "Site B"). A comparison of images 202 and 204 shows that certain changes have taken place in the city block. Change 1 shows that a small structure or building was present in Time Period A, but not present in Time Period B. This is a negative change because a structure (or object) has been subtracted. Change 2 shows that a building height increased in Time Period B from Time Period A. We consider this a positive change because additional structure is present in the later version. Change 3 shows that a small structure was present in Time Period A but not present in Time Period B (another negative change). Change 4 shows that a building height decreased from Time Period A to Time Period B (a negative change). In change 5 we see that a small building was present in Time Period A, but not present in Time Period B (a negative change).

In image 206 we see a two dimensional (e.g., DEM A) depiction of the scene A. This DEM only contains the locations of the points on the top of the buildings and on the ground (earth) level. Similarly, Image 210 is a two dimensional depiction (e.g., DEM B) of image 204.

Image 208 is a two dimensional depiction of the objects that have changed from scene A to scene B. Using image 206 and image 210 as inputs, image 208 has been produced as a result of the DEM Change Analysis process, as in step 120 of FIG. 1A. Image 212 has been produced by a DEM to polygonal model conflation such as that performed in step 122 of FIG. 1A. Thus, image 212 depicts the content of image 208 with greater detail or attributes.

According to another embodiment, we show changes to a 3D scene in an image as being a different color from parts of the scene that have not changed. For example, positive changes can be shown in green and negative changes in red. Thus in image 208 the objects shown can be depicted in red when they have disappeared (negative elevation change), green when they are new (positive elevation change) and in a blend or grayscale and color when they have increased or decreased in size.

Obviously, there is a limit to the attribute data that can be depicted in a display. Thus, in other embodiments the changes can be shown in non-visual or non-graphical ways such as providing data on a changed object that shows its coordinates and those of the change. In the case where a building has increased in height, the difference in heights can be provided as a metric. The change information can also be displayed to a user in text form. In yet another alternative, the change information can be displayed in a combination of color visual displays and associated text data.

Figure 3:
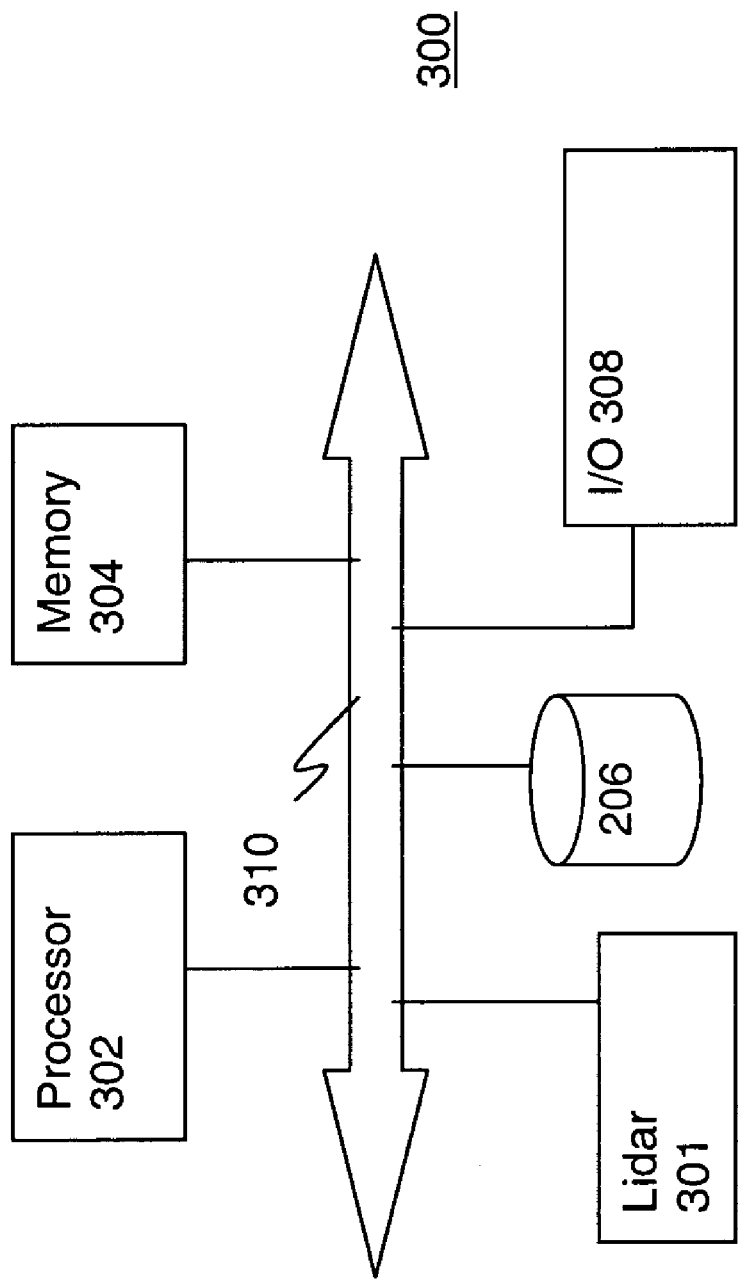
FIG. 3 is a high level block diagram showing an information processing system configured to operate according to embodiments of the invention.

Referring to FIG. 3, there is shown a simplified block diagram of an information processing system 300 according to an embodiment of the invention. The system 300 comprises a processor 302, a memory 304, and an input/output (I/O) subsystem 306. The system 300 further comprises a LIDAR instrument 301 that provides a digital model of a 3D site. Alternatively, the data can also be obtained from another source. The memory 304 represents the system working memory (e.g., a random-access memory or RAM). It can be volatile or non-volatile. The system 300 can also comprise a magnetic media mass storage device such as a hard disk drive 206. The system 300 also includes an I/O subsystem 308 which may comprise various end user interfaces such as a display, a keyboards and a mouse. The I/O subsystem 308 may further comprise a connection to a network such as a local-area network (LAN) or side-area network (WAN) such as the Internet. These components can be connected via a system bus 310.

According to an embodiment of the invention, the system 300 is programmable and a computer readable medium can include program instructions for operating the programmable computer according to the invention. Those skilled in the art will appreciate that other low-level components and connections are required in any practical application of a computer apparatus.

According to an embodiment, the processor 302 is configured (e.g., programmed) to perform the DEM change analysis 120 (or DTM change analysis 121). As an alternative to using LIDAR 301, the system 300 can include inputs for receiving polygonal models A and B or other digital models (e.g., as part of the I/O subsystem 308). The system may optionally receive LIDAR data sources via the I/O subsystem 308 without necessarily connecting the LIDAR itself to the system bus. According to another embodiment, the system 300 can be implemented such that the processor 302 is configured for performing a mean square error function on the first and second digital models to measure relative error, and it includes a user interface for providing a user with an indication of at least some differences between the first and second digital models.

According to another embodiment, the processor 302 can be configured to perform a conflation operation with a received DEM and a more detailed database (such as a polygonal model of the same scene) to produce the object level change database 124.

Therefore, while there has been described what is presently considered to be the preferred embodiment, it will be understood by those skilled in the art that other modifications can be made within the spirit of the invention.

I claim:

1. A method comprising:
    receiving a first digital model of a first three-dimensional scene comprising a plurality of points and a plurality of objects, each object comprising a cluster of points;
    receiving a second digital model of a second three-dimensional scene comprising a plurality of points and a plurality of objects, each object comprising a cluster of points;
    performing a change analysis on the first and second digital models to provide a difference indication representing a difference between the first and second digital models, the change analysis including performing a digital model to database conflation comprising
       identifying objects in one digital model that are different from their counterpart objects in the other digital model to create a set of changed objects,
       deriving from the database additional attributes relating to each changed object, and
       creating an object level change database comprising information identifying each changed object and the additional attributes relating to each changed object; and
    providing a visual representation of differences between the first and second digital models with the visual representation comprising an image showing positive and negative object level changes in different colors.

2. The method of claim 1, wherein the change analysis further comprises performing a mean square error function on the points of each digital model and the difference indication comprises a mean square error value representing the difference between the first and second digital models.

3. The method of claim 1, wherein the change analysis further comprises performing a subtraction of the second digital model from the first digital model to produce a difference digital model; and the subtraction is performed by subtracting each point in the second digital model from its corresponding point in the first digital model.

4. The method of claim 3, wherein the change analysis further comprises outputting the difference resulting from the subtraction of each set of corresponding points if the absolute value of the difference is greater than a threshold and outputting a null value if the absolute value of the difference not greater than the threshold.

5. The method of claim 3 further comprising performing a mean square error function on the difference digital model.

6. The method of claim 1, wherein the first digital model comprises a first three-dimensional polygonal model representing the first three-dimensional scene; and the second digital model comprises a second three-dimensional polygonal model representing the second three-dimensional scene.

7. The method of claim 1, wherein the first digital model comprises a first Digital Terrain Model (DTM) representing the first three-dimensional scene; the second digital model comprises a second DTM representing the second three-dimensional scene; and the method further comprises:
    converting the first DTM to a first Digital Elevation Model (DEM);
    converting the second DTM to a second DEM;
    converting the first DEM to a first list of three-dimensional points; and
    converting the second DEM to a second list of three-dimensional points.

8. The method of claim 7, further comprising performing a change analysis on the first and second DEMs to provide a difference DEM providing an indication of difference between the first and second DEMs.

9. The method of claim 1, wherein the first digital model comprises a first three-dimensional polygonal model representing the first three-dimensional scene; and the second digital model comprises a second DTM representing the second three-dimensional scene or vice versa.

10. The method of claim 9, further comprising performing a DEM to polygonal model conflation wherein data attributes derived form the polygonal model representing object level changes are added to objects in the second three-dimensional scene that are different from counterpart objects in the first three-dimensional scene.

11. The method of claim 9 further comprising:
    converting the first polygonal model to a first DEM;
    converting the second polygonal model to a second DEM;
    converting the first DEM to a first list of three-dimensional points; and
    converting the second DEM to a second list of three-dimensional points.

12. The method of claim 1, wherein the second three-dimensional scene comprises data representing the first three-dimensional scene collected at a time different from when the data representing the first three-dimensional scene was collected.

13. The method of claim 1, wherein the first digital model comprises a first DTM model representing the first three-dimensional scene; the second digital model comprises a second DTM model representing the second three-dimensional scene; and the method further comprises performing a change analysis on the first and second DTM models to provide a difference DTM model providing an indication of difference between the first and second DTM models.

14. The method of claim 1, further comprising adding a mean square error value for each entry in the object level change database.

15. The method of claim 1, wherein the difference DEM represents objects in the second three-dimensional scene that are different from their positional counterparts in the first three-dimensional scene.

16. The method of claim 1, wherein the second three-dimensional scene comprises data representing the first three-dimensional scene collected via a different technique from that used to collect the first three-dimensional scene.

17. An information processing system comprising:
    an input for receiving a first digital model of a first three-dimensional scene comprising a plurality of points and a plurality of objects, each object comprising a cluster of points;
    an input for receiving a second digital model of a second three-dimensional scene comprising a plurality of points and a plurality of objects, each object comprising a cluster of points; and
    a processor configured for performing a change analysis on the first and second digital models to provide a difference indication representing a difference between the first and second digital models, the change analysis comprising performing a digital model to database conflation comprising identifying objects in one digital model that are different from their counterpart objects in the other digital model to create a set of changed objects, deriving from the database additional attributes relating to each changed object; and creating an object level change database comprising information identifying each changed object and the additional attributes relating to each changed object, and said processor also configured for providing a visual representation of differences between the first and second digital models and the visual representation comprises an image showing positive and negative object level changes different colors.

18. The system of claim 17, wherein the change analysis further comprises performing a mean square error function on the points of each digital model and the difference indication comprises a mean square error value representing the difference between the first and second models.

19. The system of claim 17, wherein the change analysis further comprises performing a subtraction of the second digital model from the first digital model; and the subtraction is performed by subtracting each point in the second digital model from its corresponding point in the first digital model.

20. The system of claim 17, wherein the change analysis further comprises outputting the difference resulting from the subtraction of each set of corresponding points if the difference is greater than a threshold and outputting a null value if the difference not greater than the threshold.

21. The system of claim 17, wherein the first digital model comprises a first DEM representing the first three-dimensional scene; the second digital model comprises a second DEM representing the second three-dimensional scene; and the processor is further configured for converting the first DEM to a first list of three-dimensional points; and for converting the second DEM to a second list of three-dimensional points.

22. The system of claim 21, wherein the processor is additionally configured for performing conflation indicating objects in the second three-dimensional scene that are different from their positional counterparts in the first three-dimensional scene.

23. The system of claim 17, wherein the processor is configured for performing a change analysis on the first and second DEMs to provide a difference DEM providing indication of difference between the first and second DEMs.

24. A method comprising:

receiving a first digital model of a first three-dimensional scene comprising a plurality of points and a plurality of objects, each object comprising a cluster of points;

receiving a second digital model of a second three-dimensional scene comprising a plurality of points and a plurality of objects, each object comprising a cluster of points; and performing a change analysis on the first and second digital models to provide a difference indication representing a difference between the first and second digital models, the change analysis including performing a digital model to database conflation comprising identifying objects in one digital model that are different from their counterpart objects in the other digital model to create a set of changed objects; and deriving from the database additional attributes relating to each changed object, and creating an object level change database comprising information identifying each changed object and the additional attributes relating to each changed object;

adding a mean square error value for each entry in the object level change database; and presenting a visual display of the objects in the second three-dimensional scene that are different from their counterparts in the first three-dimensional scene wherein the data attributes are represented by different colors.

* * * * *